United States Patent [19]
Sasaki

[11] Patent Number: 5,507,258
[45] Date of Patent: Apr. 16, 1996

[54] PISTONS FOR INTERNAL COMBUSTION ENGINES

[75] Inventor: Masato Sasaki, Atsugi City, Japan

[73] Assignee: Unisia Jecs Corporation, Atsugi City, Japan

[21] Appl. No.: 186,523

[22] Filed: Jan. 26, 1994

[30] Foreign Application Priority Data

Jan. 26, 1993  [JP]  Japan ..................................... 5-010380

[51] Int. Cl.$^6$ ....................................................... F02F 3/00
[52] U.S. Cl. ..................... 123/193.6; 29/888.046
[58] Field of Search ............................. 123/193.6, 193.1; 29/888.046, 888.049, 888.04; 92/254, 213, 222, 224

[56]  References Cited

U.S. PATENT DOCUMENTS

| | | | |
|---|---|---|---|
| 4,292,936 | 10/1981 | Morishita et al. | 29/888.049 |
| 4,498,219 | 2/1985 | Ban et al. | 29/888.046 |
| 4,524,498 | 6/1985 | Hartsock | 123/193.6 |
| 4,643,078 | 2/1987 | Ban | 92/212 |
| 4,651,631 | 3/1987 | Avezou | 29/888.046 |
| 4,658,706 | 4/1987 | Sander et al. | 123/193.6 |
| 4,677,901 | 7/1987 | Ban et al. | 29/888.046 |
| 4,694,735 | 9/1987 | Tatematsu et al. | 123/193.6 |
| 4,706,550 | 11/1987 | Bullat | 123/193.6 |
| 4,708,104 | 11/1987 | Day et al. | 29/888.046 |
| 4,730,548 | 3/1988 | Maeda et al. | 123/193.6 |
| 4,966,221 | 10/1990 | Takasuga et al. | |
| 5,119,777 | 6/1992 | Mielke et al. | 123/193.6 |

FOREIGN PATENT DOCUMENTS

| | | |
|---|---|---|
| 3801847 | 8/1988 | Germany . |
| 4010474 | 10/1991 | Germany . |
| 59-201953 | 11/1984 | Japan . |
| 1-190951 | 8/1989 | Japan . |
| 3-30708 | 5/1991 | Japan . |
| 4-76256 | 3/1992 | Japan . |

OTHER PUBLICATIONS

Automotive Technique No. 891,056 published in May, 1989 by Automotive Technique Society.
No. 1 Technical Revue published in 1988 by Mitsubishi Motor Co., Ltd.
A. Heitmann, "Keramik–der andere Werkstoff Eine Herausforderung für den Konstrukteur", Konstruktion 43 (1991) pp. 167–169, Berlin, Federal Republic of Germany.

*Primary Examiner*—Marguerite Macy
*Attorney, Agent, or Firm*—Foley & Lardner

[57]  ABSTRACT

A piston for an internal combustion engine comprises a wear resisting annulus made of aluminum alloy containing SiC particulates, the wear resisting annulus being cast within a top ring groove upon casting of a piston made of aluminum alloy.

9 Claims, 3 Drawing Sheets

PISTONS FOR INTERNAL COMBUSTION ENGINES

BACKGROUND OF THE INVENTION

The present invention relates generally to pistons for internal combustion engines for motor vehicles, etc. and more particularly, to piston ring grooves thereof.

In recent years, pistons for internal combustion engines for motor vehicles are made of aluminum alloy instead of cast iron so as to achieve a weight reduction in view of requirements of high power and high performance. Grooves for receiving piston rings are formed on an outer peripheral surface of the piston which faces an inner wall of a cylinder bore. A top ring groove, the nearest one of the piston ring grooves with respect to a combustion chamber, suffers great wear by a piston ring (top ring) due to exposure to a high temperature and direct receiving of a combustion pressure in particular. Thus, aluminum micro-welding is apt to occur between the top ring groove and tile top ring.

Various techniques have been proposed to prevent such aluminum micro-welding: 1) Reinforcement of the surface of the top ring groove by compounding inorganic fiber aggregate (see JP-A 59-201953); 2) Application of hybrid MMC (metal matrix composites) by In-Situ process to the pistons (see Automotive Technique No. 891,056 published in May, 1989 by Automotive Technique Society); 3) Reinforcement of the surface of the top ring groove by compounding nickel porous material (see JP-B2 3-30708); 4) Reinforcement of tile surface of the top ring groove by an alumite-treated layer (see JP-A 1-190951); 5) Formation of a copper-alloy layer by electron beam fusion treatment on the surface of the piston ring groove (see No. 1 Technical Revue published in 1988 by Mitsubishi Motor Co., Ltd.; 6) Formation of a ring support portion in the top ring groove by casting aluminum alloy around Ni-resist cast iron as alfin-treated.

However, the above prior arts present the following inconveniences: The prior arts 1)–3) need the use of a high-pressure solidification method in view of applied materials such as inorganic fiber, etc. with respect to a forming method. This results in a rise of manufacturing cost and a restriction of the piston shape.

The prior art 4) contributes to improvement of a micro-welding resistance with the piston ring due to presence of the alumite-treated layer, but fails to provide a sufficient wear resistance. On the contrary, the prior art 5) may fall to provide a sufficient micro-welding resistance.

The prior art 6), a technique being applied from long ago, ensures a wear resistance and a micro-welding resistance, but cannot avoid a weight increase due to cast iron making.

It is, therefore, an object of the present invention to provide pistons for internal combustion engines which provide sufficient wear resistance and micro-welding resistance without any increase in weight and manufacturing cost.

SUMMARY OF THE INVENTION

According to one aspect of the present invention, there is provided a piston for an internal combustion engine, comprising:

a main body made of aluminum alloy;

groove means for defining a plurality of piston ring grooves on an outer periphery of said main body; and wear resisting means disposed on said groove means for resisting wear, said wear resisting means being made of aluminum alloy containing silicon carbide (SiC) particulates.

According to another aspect of the present invention, there is provided a method of manufacturing a piston for an internal combustion engine, the method comprising the steps of:

forming a wear resisting annulus out of aluminum alloy containing silicon carbide (SiC) particulates;

subjecting said wear resisting annulus to a chemical conversion treatment; and casting molten aluminum alloy for a piston main body around said wear resisting annulus.

DETAILED DESCRIPTION OF THE INVENTION

Figure 1:
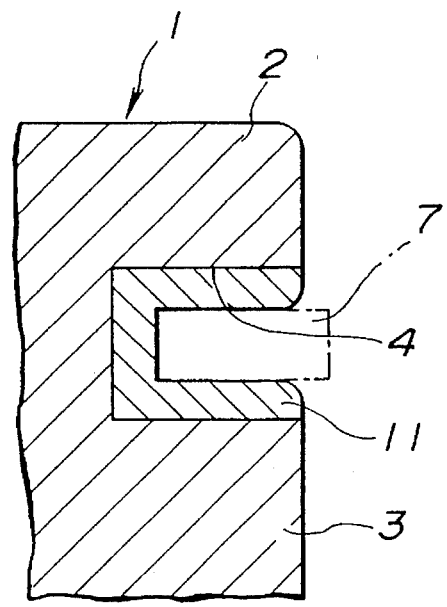
FIG. 1 is a fragmentary enlarged section showing a top ring groove of a piston embodying the present invention.
Figure 2:
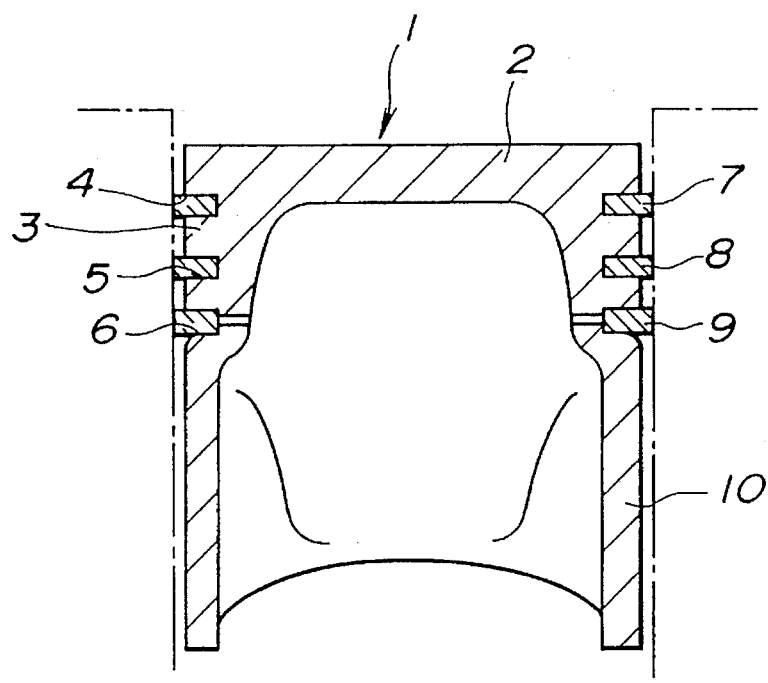
FIG. 2 is a longitudinal section showing the piston.

Referring to the drawings, particularly to FIGS. 1 and 2, a piston includes a piston main body 1 which is made of aluminum alloy (JISAC8A-T6) and shaped substantially like a cylinder and has a crown 2 facing a combustion chamber, three piston ring grooves 4, 5, 6 formed on an outer peripheral surface of a ring land 3 arranged below the crown 2, three piston rings 7, 8, 9 engaged with the piston ring grooves (top, second and oil ring grooves) 4, 5, 6, and a skirt 10 arranged below the piston ring grooves 4, 5, 6.

The top ring groove 4 is formed to have a middle 9 mm distant from a top face of the crown 2, and be 4 mm in width and 8 mm in depth. Additionally, only a surface of tile top ring groove 4 is formed by a wear resisting annulus 11 made according to a forming method as will be described later.

The wear resisting annulus 11 is made of aluminum alloy containing silicon carbide (SiC) particulates, and cast within the piston main body 1 so as to form the surface of the top ring groove 4.

The forming method of the wear resisting annulus 11 will be described concretely. First, an aluminum alloy cast ingot containing SiC particulates of several micrometers to tens of micrometers in maximum diameter is melted in an inert atmosphere such as argon gas or the like and maintained at 993° K., then subjected to mechanical agitation so as to uniformly disperse SiC particulates in aluminum alloy material.

Figure 3:
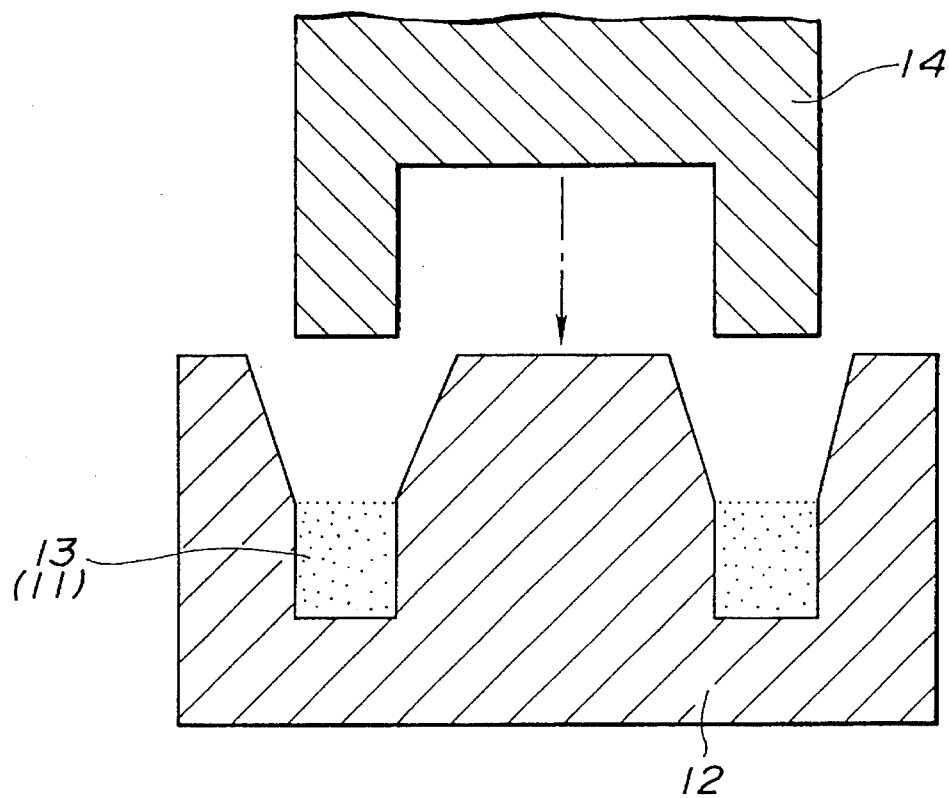
FIG. 3 is a view similar to FIG. 2, showing metal molds for a wear resisting annuls for the top ring groove.

Referring to FIG. 3, a molten aluminum alloy 13 containing SiC particulates is injected into a lower mold 12, and pressured by an upper mold 14 for solidification. After cooling, a rough section of the wear resisting annulus 11 is taken out of the lower mold 12. Then, a dead head is cut out, and machining is carried out if necessary, thus completing a forming work of the wear resisting annulus 11.

The rough section of the wear resisting annulus 11 can be made according to a die casting method or a molten metal casting method in addition to the above gravity casting method. Moreover, a powder metal forging method is applicable. According to this, SiC particulates are mixed with aluminum alloy particulates, which are charged in a metal mold, and pressured by the upper mold 14 for forming. After heating, forging is carried out to increase the density. When the increased density has not been obtained, forging is repeatedly carried out after reheating. This method allows finishing of a final product shape, necessitating no subsequent machining, resulting in an improved working efficiency.

The wear resisting annulus 11 formed in such a way is cast within the piston main body 1 for fixing. An example of this casting condition is such that a preheating temperature of tile wear resisting annulus 11 is 673° K., an injecting temperature of molten alloy of the piston main body 1 is 993° K., a temperature of the molds is 473° K., and a chemical conversion treatment of the wear resisting annulus 11 is carried out in a 313° K. heated Palcoal 3756 solution of Parka Rising Co., Ltd. during 60 seconds of immersion.

The reason why tile wear resisting annulus 11 is previously subjected to the chemical conversion treatment is as follows: Since aluminum material has a fine oxide film formed on a surface thereof, a sufficient deposition cannot be obtained at a contact interface with the molten alloy, resulting in insufficient joining of an aluminum layer of the piston main body 1 formed by molten alloy with the wear resisting annulus 11 made of aluminum alloy. When raising a heating temperature of molten alloy or carrying out sufficient preheating of the wear resisting annulus 11, there appears a phenomenon of deposition. However, due to highly restricted condition and range of this deposition, uniform joining is practically difficult to carry out.

Particularly, preheating of the wear resisting annulus 11 causes thickening of the oxide film, resulting in increasing possible difficulty in joining.

When previously carrying out the chemical conversion treatment as described above, a chemical-conversion-treated layer is oxidized by preheating, while aluminum alloy material of the wear resisting annulus 11 is not oxidized. Oxide of the chemical-conversion-treated layer is easily eliminated by molten aluminum alloy of the piston main body 1, aluminum alloy of the piston main body 1 and that of the wear resisting annulus 11 can be connected to each other with a high joining strength.

Results of an examination on characteristic variations will be described with regard to the wear resistance, micro-welding resistance, and machinability of the wear resisting annulus 11 formed through the above processes.

Table 1 shows components of matrix aluminum alloy. In this examination, a sample made according to the casting method was used, and an additional amount of SiC particulates was evaluated on seven aluminum alloy materials of 0, 5, 10, 15, 20, 25, and 30% by weight.

TABLE 1

| Components of Matrix Aluminum Alloy | | | | | | |
| --- | --- | --- | --- | --- | --- | --- |
| Si | Fe | Cu | Mg | Ni | Ti | Al |
| 10.3 | 0.2 | 3.0 | 1.15 | 1.25 | 0.2 | REM. |

Figure 4:
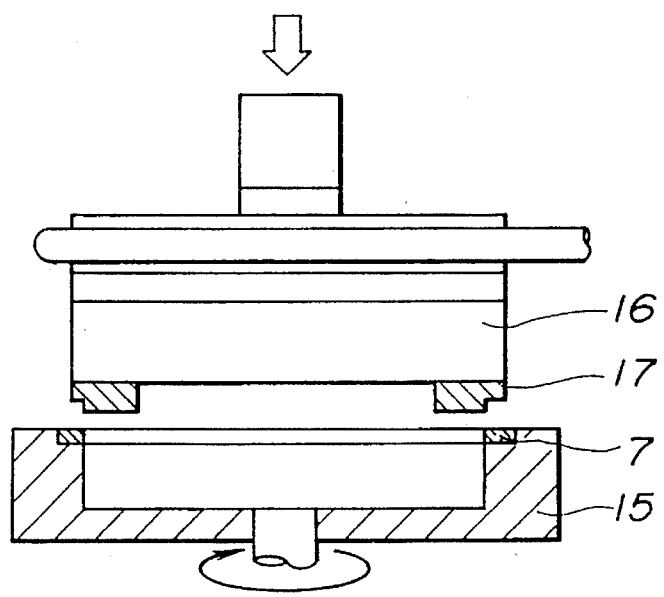
FIG. 4 is a schematic drawing showing an examination on a wear resistance.

An evaluation method of the wear resistance used an apparatus as shown in FIG. 4. Specifically, the piston ring 7 is fixed on a rotary bed 15 rotated by a motor (not shown). A test piece 17 fixed at a lower end of a heater 16 is pressed against an upper portion of the piston ring 7 for abrasion. This test piece 17 is a part of the wear resisting annulus 11 cut out of the ring groove of the piston main body 1. In this method, test conditions such as temperature, lubrication, etc. are established to be correlative with the piston of the real engine. Evaluation is carried out on the depth of wear after examination.

Figure 5:
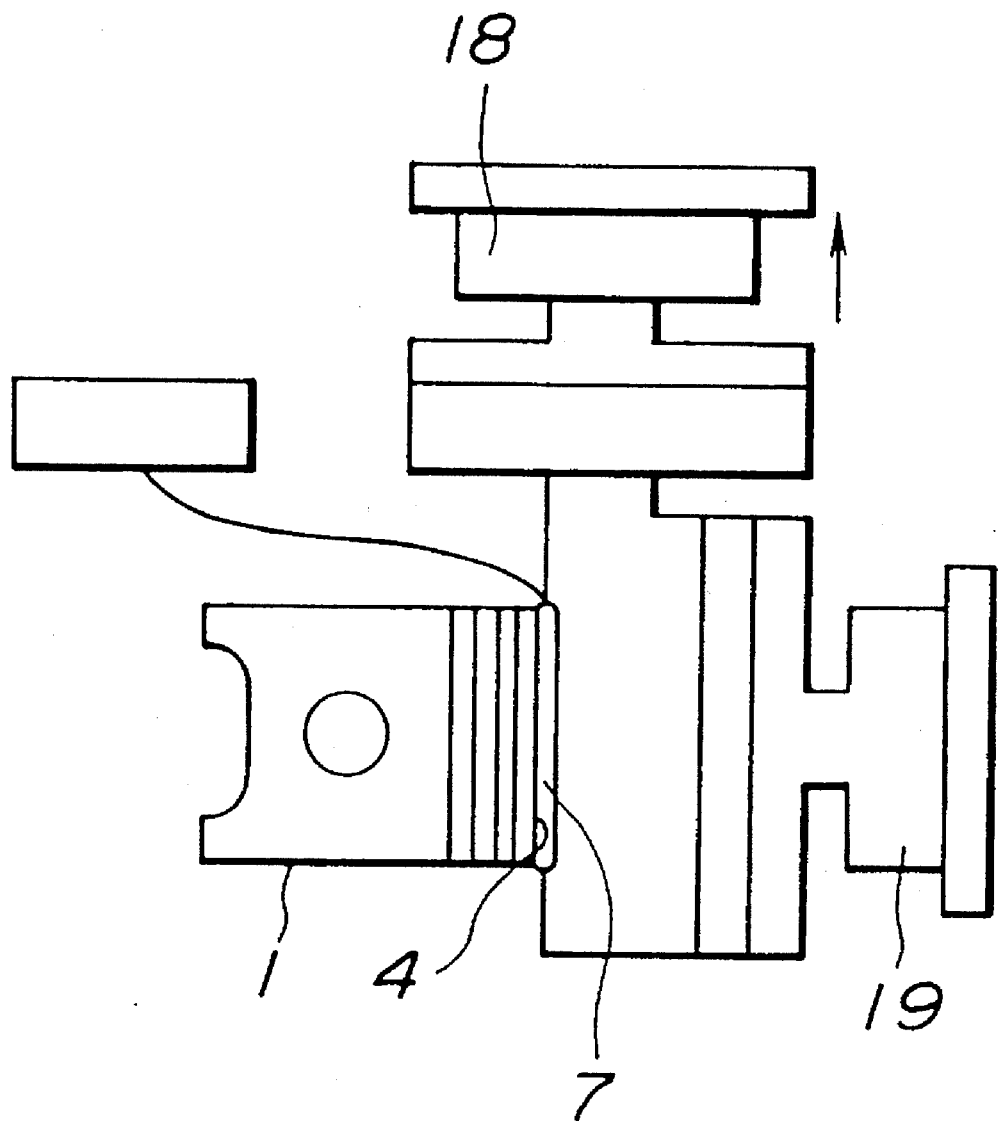
FIG. 5 is a view similar to FIG. 4, showing an examination on a micro-welding resistance.

An evaluation method of the micro-welding resistance used an apparatus as shown in FIG. 5. Specifically, an acceleration test method is adopted in which the piston ring 7 is pressed against an underside of the top ring groove 4 of the piston main body 1, and is slid only in one direction as indicated by an arrow in FIG. 5 through actuators 18, 19. Evaluation is carried out on a rate of a welded and worn area of the ring groove 4 to a slide area of the piston ring 7.

Evaluation of the machinability was carried out such that a cylindrical rough section of 70 mm diameter is machined in the following conditions, and the total machining time until a tool has a wear amount of 0.3 mm is measured:

Machining velocity: 200 m/min

Cut amount: 0.8 mm

Feed amount: 0.08 mm/rotation

Tool used: gas-phase synthetic diamond tool manufactured by Asahi Daiya Co., Ltd.

Table 2 shows results of the above evaluations.

In Table 2, the wear resistance is given by a rate when a wear amount is determined at 100 without SiC particulates added (0% by weight). A smaller value indicates smaller wear.

The micro-welding resistance is given by a rate when a welded area is determined at 100 without SiC particulates added (0% by weight). A smaller value indicates smaller micro-welding.

The machinability is given by a tool life with respect to 100 when the rough sections without SiC particulates added are machined by using a sintered diamond tool COMPAX manufactured by General Electric Co., Ltd. It is to be noted that the rough sections with SiC particulates added are machined by the gas-phase synthetic diamond tool.

TABLE 2

| | Evaluation Results | | |
| --- | --- | --- | --- |
| Addition Amount of SiC Partic. | Wear Resistance | Micro-Weld. Resistance | Machinability |
| 0 | 100 | 100 | 100 |
| 5 | 6 | 10 | 20 |
| 10 | 3 | 0 | 15 |
| 15 | 3 | 0 | 12 |
| 20 | 3 | 0 | 10 |
| 25 | 2 | 0 | 2 |
| 30 | 2 | 0 | Impossible Machining |

As seen from Table 2, even when the additional amount of SiC particulates is 5% by weight, the wear resistance is largely improved as compared with a case without addition. At 10% by weight, an effect of addition becomes substantially constant.

The micro-welding resistance shows a similar tendency. It is understood that even when the additional amount of SiC particulates is 5% by weight, the micro-welding resistance is largely improved as compared with a case without addition. At 10% by weight or more, there is no occurrence of micro-welding.

On the other hand, even when the additional amount of SiC particulates is 5% by weight, the machinability deteriorates as compared with a case without addition. With an increase in the addition amount, the machinability gets worse, and at 304 by weight, the tool has an edge broken, falling in impossible machining.

The above examination reveals that the optimum addition amount of SiC particulates is in a range of from 5 to 254 by weight, preferably, from 10 to 204 by weight.

Next, an operation test was carried out with regard to the piston having the piston main body 1 of aluminum alloy which was cast around the wear resisting annulus 11 of aluminum alloy with SiC particulates added, the piston being built in the internal combustion engine. The additional amount of SiC particulates in the wear resisting annulus 11 was set at 104 by weight. Additionally, for comparison, an operation test was carried out with regard to a piston having a piston main body without the wear resisting annulus 11.

Operation conditions are as follows: A four-cylinder 1,600 cc-displacement gasoline engine is used, and subjected to 100 hours continuous running at an oil temperature 150° C. and a coolant temperature 120° C.

Results are such that the piston without the wear resisting annulus 11 suffers 50 micrometers abrasion, and produces micro-welding on 854 of the underside of the top ring groove 4, while the piston with the wear resisting annulus 11 suffers neither abrasion nor micro-welding.

What is claimed is:

1. A piston for an internal combustion engine, comprising:
   a main body made of aluminum alloy;
   groove means for defining a plurality of piston ring grooves on an outer periphery of said main body; and
   a solid annulus disposed on said groove means for resisting wear, said solid annulus being made of aluminium alloy containing silicon carbide (SiC) particulates, said groove means being cast around said solid annulus.

2. A piston as claimed in claim 1, wherein said SiC particulates correspond to 5 to 25% by weight.

3. A piston as claimed in claim 2, wherein said SiC particulates have diameters ranging from several micrometers to tens of micrometers.

4. A piston as claimed in claim 1, wherein said solid annulus is disposed on a top ring groove.

5. A piston as claimed in claim 1, wherein said solid annulus is cast.

6. A piston as claimed in claim 1, wherein said solid annulus is forged.

7. A piston as claimed in claim 2, wherein said SiC particulates correspond to 10 to 20% by weight.

8. A piston for an internal combustion engine, comprising:
   a main body made of aluminium alloy having a plurality of piston ring grooves on an outer periphery thereof; and
   a solid annulus cast around and disposed on one of said grooves, said solid annulus being made of aluminium alloy containing silicon carbide particulates.

9. A piston as claimed in claim 8, wherein said one of the grooves is a top ring groove.

\* \* \* \* \*